United States Patent
Carmel et al.

(10) Patent No.: US 7,401,073 B2
(45) Date of Patent: Jul. 15, 2008

(54) TERM-STATISTICS MODIFICATION FOR CATEGORY-BASED SEARCH

(75) Inventors: David Carmel, Haifa (IL); Adam Darlow, Haifa (IL); Yael Petruschka, Haifa (IL); Aya Soffer, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 11/117,749

(22) Filed: Apr. 28, 2008

(65) Prior Publication Data
US 2006/0248074 A1    Nov. 2, 2006

(51) Int. Cl.
*G06F 17/30*   (2006.01)
(52) U.S. Cl. ..................... 707/3; 707/1; 707/5
(58) Field of Classification Search ......... 707/3, 707/5
See application file for complete search history.

(56) References Cited

U.S. PATENT DOCUMENTS

| | | | |
|---|---|---|---|
| 5,826,260 | A | 10/1998 | Byrd, Jr. et al. |
| 6,766,316 | B2 | 7/2004 | Caudill et al. |
| 6,795,820 | B2 | 9/2004 | Barnett |
| 6,829,599 | B2 | 12/2004 | Chidlovskii |
| 2002/0123994 | A1 | 9/2002 | Schabes et al. |
| 2003/0195877 | A1 | 10/2003 | Ford et al. |
| 2004/0002973 | A1 | 1/2004 | Chaudhuri et al. |
| 2004/0064438 | A1 | 4/2004 | Kostoff |

OTHER PUBLICATIONS

Piatetsky-Shapiro, Gregory, et al., "Accurate Estimation of the Number of Tuples Satisfying a Condition", Proceedings of ACM SIGMOD Conference, pp. 256-276, 1984.

Chen, Zhiyuan, et al., "Selectivity Estimation for Boolean Queries," Proceedings of the ACM Symposium on Principles of Database Systems, 2000.

Maarek, Yoelle S. et al., "Full Text Indexing Based on Lexical Relations, An Application: Software Libraries", Proceedings of the Twelfth Annual International ACM SIGIR Conference on Research and Development in Information Retrieval, 1989, pp. 198-206.

Salton, Gerard et al., "Introduction to Modern Information Retrieval," McGraw-Hill, 1983, chapter 3, pp. 52-63.

Grover, Eric J. et al., "Improving Categtory Specific Web Search by Learning Query Modifications," IEEE Symposium on Applications and the Internet (SAINT 2001), San Diego, California, Jan. 2001, pp. 23-31.

Agarwal, Panakaj et al., "Exact and Approximation Algorithms for Clustering", Proceedings of the Ninth Annual ACM-SIAM Symposium on Discrete Algorithms, San Francisco, California, Jan. 25-27, 1998, pp. 658-667.

Voorhees, Ellen M. et al., Overview of the Seventh Text Retrieval Conference (TREC-7), Proceedings of the Seventh Text Retrieval Conference (TREC-7), National Institute of Standards and Technology, 1999.

*Primary Examiner*—Hosain T Alam
*Assistant Examiner*—Amy Ng

(57) ABSTRACT

A method for searching a document collection includes providing an index of terms indicating the documents in which the terms appear. A first statistical distribution of each of at least some of the terms in the index and a second statistical distribution of each of at least some of the categories are estimated a over the documents in the collection. A query including one or more of the terms and a category restriction referring to at least one of the categories is accepted. A modified term distribution is produced by operating on the first statistical distribution of at least one of the terms in the query using the second statistical distribution, responsively to the category restriction. The query is applied to the index to return a response, in which occurrences of the at least one of the terms are scored responsively to the modified term distribution.

7 Claims, 3 Drawing Sheets

TERM-STATISTICS MODIFICATION FOR CATEGORY-BASED SEARCH

FIELD OF THE INVENTION

The present invention relates generally to information retrieval systems, and particularly to methods and systems for ranking results in category-based document searches.

BACKGROUND OF THE INVENTION

Text retrieval engines (TREs), or search engines, are used in a variety of web, intranet and desktop applications. In a typical information retrieval (IR) application, each document in a document collection is described by a set of representative keywords or phrases called "index terms." The TRE searches the documents in the collection in response to a user query that comprises one or more of the index terms. The TRE typically returns a list of documents that best match the user query.

Most advanced information retrieval applications create an index of the documents in the collection that is to be searched. An example of such a system is the Guru search engine, which is described by Maarek and Smadja in "Full Text Indexing Based on Lexical Relations, an Application: Software Libraries," Proceedings of the Twelfth Annual International ACM SIGIR Conference on Research and Development in Information Retrieval, 1989, pages 198-206, which is incorporated herein by reference.

The index typically contains, for each document, a set of index terms that appear in the document with a score assigned to each index term. A typical scoring model used in many information retrieval systems is the TF-IDF formula, described by Salton and McGill in "An Introduction to Modern Information Retrieval," McGraw-Hill, 1983, chapter 3, pages 52-63, which is incorporated herein by reference. The score of term T for document D depends on the term frequency of T in D (denoted TF), the length of document D, and the inverse of the number of documents containing term T in the collection (inverse document frequency, denoted IDF).

Document scores are typically used to rank the search results provided by the TRE in terms of their relevance to the query terms. For example, U.S. Patent Application Publication 2004/0002973 A1, whose disclosure is incorporated herein by reference, describes a method for automatically ranking database records by relevance to a given query. A similarity function is derived from data in the database and/or queries in a workload. The similarity function is then applied to a given query and used to rank the records.

In many information retrieval applications, documents are associated with one or more categories. The user query may request that the search be limited to one category or a combination of such categories. This search mode is referred to as "category-based search." For example, U.S. Patent Application Publication 2003/0195877 A1, whose disclosure is incorporated herein by reference, describes a search engine that displays the results of a multiple-category search according to levels of relevance of the categories to a user search query.

Several publications propose methods for performing category-based searches. For example, U.S. Pat. No. 5,826,260, whose disclosure is incorporated herein by reference, describes an information retrieval system that analyzes a user query and presents a "hit list" of documents to the user. The presented hit list displays an overall rank of a document and the contribution of each query element to the overall rank. The user can then reorder the hit list by prioritizing the contribution of individual query elements to override the overall rank, and by assigning additional weights to those contributions.

Another approach for category-based searching is described by Glover et al. in "Improving Category Specific Web Search by Learning Query Modifications," IEEE Symposium on Applications and the Internet (SAINT 2001), San Diego, Calif., January 2001, pages 23-31, which is incorporated herein by reference. The authors describe a system that recognizes web pages of a specific category. The system learns modifications to queries that bias results toward documents in that category. Extra words or phrases are added to a user query in order to increase the likelihood that results of the desired category are ranked near the top.

In some applications, a document collection is divided into several sub-collections, and a search is defined over several such sub-collections. For example, U.S. Pat. No. 6,795,820, whose disclosure is incorporated herein by reference, describes a meta-search method conducted across multiple document collections. A multi-phase approach is employed, in which local and global statistics are dynamically exchanged between local search engines and the meta-search engine in response to a user query. The meta-search engine merges results from the individual search engines, to produce a single list of ranked results for the user.

SUMMARY OF THE INVENTION

Many conventional scoring models adjust the score assigned to a particular index term based on document frequency statistics (i.e., the number of documents in the collection that contain this index term, denoted DF). Scoring models based on the TF-IDF formula cited above are an example for such models. Using these scoring models, an index term will typically receive a lower score if it appears in many documents in the collection. Conversely, a term will receive a higher score if there are fewer documents in the collection that contain it. As a result, the TRE will rank documents that contain rare index terms higher than documents containing common terms. The logic behind this statistical adjustment is that frequently-occurring terms are assumed to be less descriptive of the user query, and therefore less relevant.

When a user limits a search query to a specific category of the collection, the user expects to see results that are ranked according to their relevance within the particular category. When conducting category-based searches, however, adjusting scores based on global statistics (i.e., statistics that were calculated over the entire document collection) may cause improper ranking of the search results. This improper ranking may cause highly relevant documents to be ranked low in the list of search results, or to be discarded from the list altogether.

A theoretical "naive" solution to this problem is for the IR system to maintain a separate index for each category. Each such index would have term statistics that are calculated only within the category. (Category-dependent statistics are also referred to as "local statistics.") This solution is not feasible in most practical cases for several reasons: The number of categories may be very large, resulting in unreasonable memory requirements for storing the multiple indices. Category definitions and contents may change with time. Furthermore, a query may be defined over a category or combination of categories (referred to as a "category restriction"), in which case the number of required indices grows combinatorically with the number of categories. The computational complexity required for pre-calculating the local statistics of all index-terms within all category restrictions is prohibitive.

There is, therefore, motivation for providing a category-based ranking method that uses a single, comprehensive index. From the user point of view, such a method should ideally rank documents as if the search considered only local term statistics, within the category restriction specified by the query.

Embodiments of the present invention provide such improved methods and systems for category-based searching. According to a disclosed method, histograms are calculated and stored for all index terms and categories in a document collection. When a user query requests a search within a specific category restriction, the term histograms and category histograms are used to calculate localized term histograms, so as to approximate the local statistics of the index terms within the specified category restriction. These localized term histograms are used to estimate the document frequency (DF) of each index term in the query within the category restriction. The TRE then ranks the documents in the category restriction according to the estimated DF in order to produce a properly ranked list.

In a disclosed embodiment, the user query may specify "dynamic category restrictions," or category definitions that were not represented as histograms in advance. To deal with this sort of query, the TRE is first invoked so as to identify documents that belong to this new category definition. New category histograms are produced accordingly, and the local statistics of index terms within the dynamic category restriction are then estimated.

In other embodiments, the histogram-based method is used to perform searching over a document collection sub-divided into multiple sub-collections.

There is therefore provided, in accordance with an embodiment of the present invention, a method for searching a document collection that includes a plurality of documents that are respectively associated with one or more categories and contain terms, the method including:

providing an index of the terms indicating the documents in which the terms appear;

estimating a first statistical distribution of each of at least some of the terms in the index and a second statistical distribution of each of at least some of the categories over the documents in the collection;

accepting a query including one or more of the terms and a category restriction referring to at least one of the categories;

operating on the first estimated statistical distribution of at least one of the terms in the query using the second estimated statistical distribution of the at least one of the categories, responsively to the category restriction, so as to produce a modified term distribution; and applying the query to the index so as to return a response in which occurrences of the at least one of the terms are scored responsively to the modified term distribution.

In a disclosed embodiment, estimating the first statistical distribution includes constructing term histograms of the at least some of the terms in the index, estimating the second statistical distribution includes constructing category histograms of the at least some of the categories, and constructing the term and category histograms includes mapping the documents in the collection to bins of the histograms. Additionally or alternatively, constructing the term and category histograms includes, when a document is added to or deleted from the collection, incrementally updating the term and category histograms responsively to the added or deleted document.

In another embodiment, operating on the first estimated statistical distribution includes determining a category restriction histogram based on the category histogram of the at least one of the categories responsively to the category restriction, and multiplying the category restriction histogram by the term histogram of the at least one of the terms in the query so as to produce a localized term histogram. Additionally or alternatively, when the category restriction refers to two or more of the categories linked by a Boolean expression, determining the category restriction histogram includes combining the category histograms of the two or more of the categories based on the Boolean expression.

In yet another embodiment, applying the query includes determining a local document frequency (DF) based on the modified term distribution, and processing the query using the local DF.

In still another embodiment, the response includes a list of the documents, and applying the query includes ordering the list responsively to the modified term distribution.

In a disclosed embodiment, estimating the second statistical distribution includes querying a text retrieval engine (TRE) responsively to the category restriction, so as to obtain a list of documents in the collection that are associated with the category restriction.

In another disclosed embodiment, the categories include sub-collections of the document collection, the category restriction refers to at least one of the sub-collections, and operating on the first estimated statistical distribution includes producing the modified term distribution so as to describe the first statistical distribution within the sub-collections referred to by the category restriction.

There is additionally provided, in accordance with an embodiment of the present invention, apparatus for searching a document collection, including:

a memory, which is arranged to store a plurality of documents that are respectively associated with one or more categories and contain terms;

a search processor, which is arranged to provide an index of the terms indicating the documents in which the terms appear, to estimate a first statistical distribution of each of at least some of the terms in the index and a second statistical distribution of each of at least some of the categories over the documents in the collection, to accept a query including one or more of the terms and a category restriction referring to at least one of the categories, to operate on the first estimated statistical distribution of at least one of the terms in the query using the second estimated statistical distribution of the at least one of the categories, responsively to the category restriction, so as to produce a modified term distribution, and to apply the query to the index so as to return a response in which occurrences of the at least one of the terms are scored responsively to the modified term distribution.

There is further provided, in accordance with an embodiment of the present invention, a computer software product for searching a document collection that includes a plurality of documents that are respectively associated with one or more categories and contain terms, the product including a computer-readable medium, in which program instructions are stored, which instructions, when read by the computer, cause the computer to store an index of the terms indicating the documents in which the terms appear, to estimate a first statistical distribution of each of at least some of the terms in the index and a second statistical distribution of each of at least some of the categories over the documents in the collection, to accept a query including one or more of the terms and a category restriction referring to at least one of the categories, to operate on the first estimated statistical distribution of at least one of the terms in the query using the second estimated statistical distribution of the at least one of the categories, responsively to the category restriction, so as to produce a modified term distribution, and to apply the query to the index so as to return a response in which occurrences of the at least one of the terms are scored responsively to the modified term distribution.

The present invention will be more fully understood from the following detailed description of the embodiments thereof, taken together with the drawings in which:

DETAILED DESCRIPTION OF EMBODIMENTS

System Description

Figure 1:
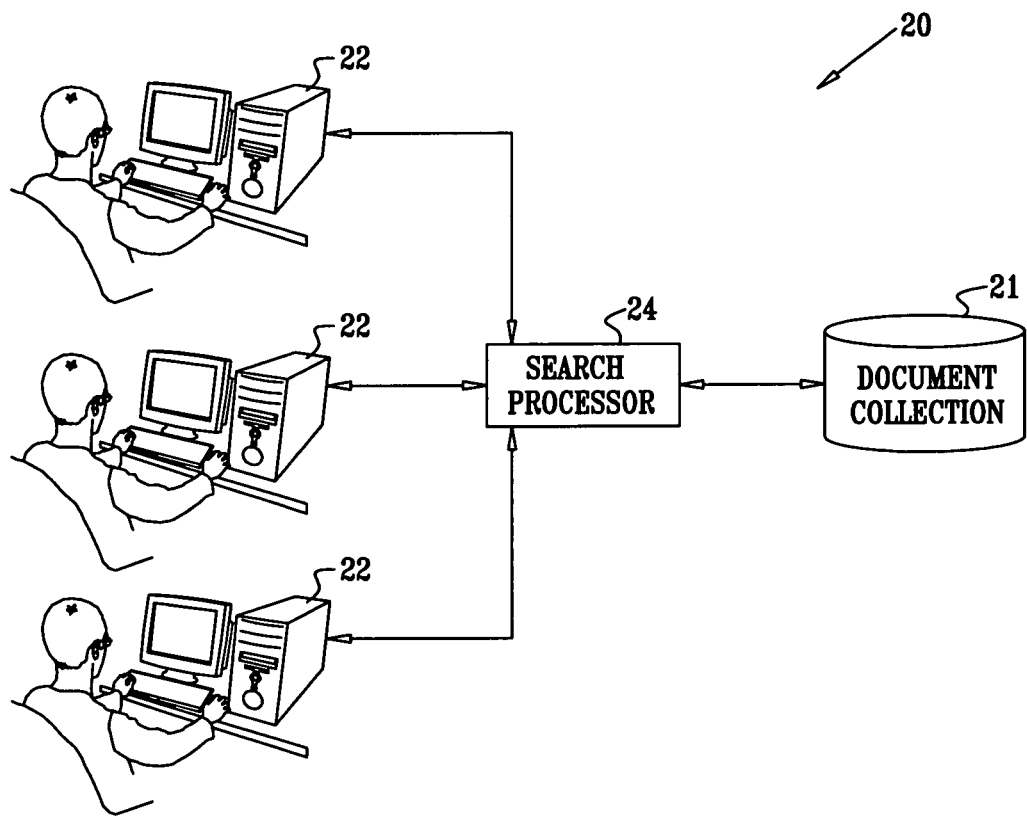
FIG. 1 is a block diagram that schematically illustrates a system for searching a document collection, in accordance with an embodiment of the present invention.

FIG. 1 is a block diagram that schematically illustrates a system 20 for searching a document collection 21, in accordance with an embodiment of the present invention. A client 22 issues a user query to a search processor 24, for searching the document collection. The processor comprises a TRE that performs the search according to methods described below. Typically, the processor produces a list of documents, ranked in terms of their relevance to the query. The list of documents is returned to client 22.

Typically, processor 24 comprises a general-purpose computer, which is programmed in software to carry out the functions described herein. The software may be downloaded to the computer in electronic form, over a network, for example, or it may alternatively be supplied to the computer on tangible media, such as CD-ROM. The processor may be a standalone unit, or it may alternatively be integrated with other computing equipment of system 20.

In addition to text documents, the methods described hereinbelow may also be applied to data files, records stored in a database, or other types of data items stored in a data structure. Adaptation of the methods to apply to such data items is straightforward and is considered to be within the scope of the present invention. In the context of the present patent application and in the claims, all these types of data items are referred to collectively as "documents," and the data structure is referred to as a "document collection."

Categories and Category Restrictions

In many applications, the document collection is divided into categories. Each document in the collection is associated with one or more categories. For example, categories may comprise knowledge domains, such as philosophy, medicine or law, or specific fields within these domains. As another example, categories may comprise departments in an organization, wherein each document is associated with the department that created it. In another example, categories may comprise user-names, wherein each document is associated with the user who owns it, such as in a mail-search application. Documents may also be categorized by one of their attributes. For example, a user may query for documents having a certain size range or date range.

Figure 2:
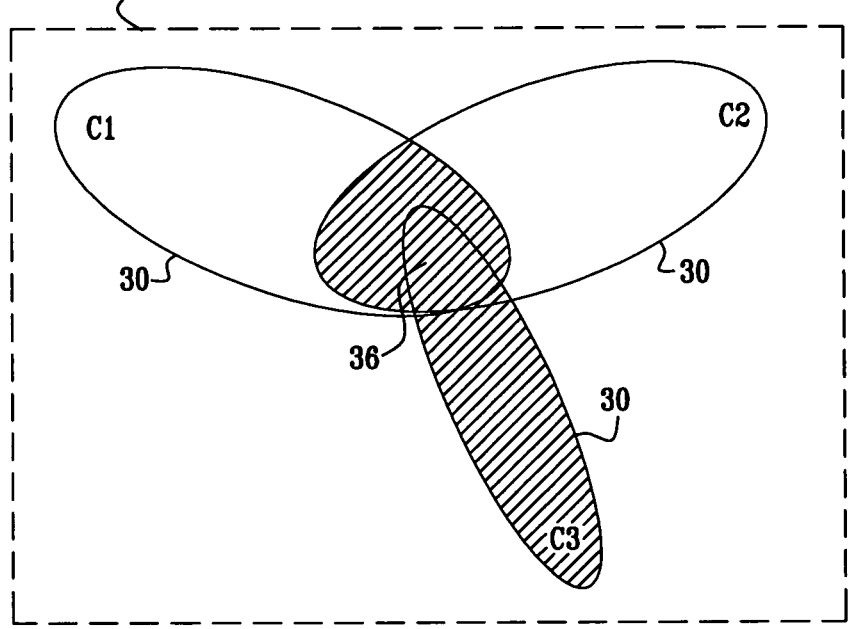
FIG. 2 is a diagram that schematically illustrates a document collection divided into categories, in accordance with an embodiment of the present invention.

FIG. 2 is a diagram that schematically illustrates document collection 21 divided into categories 30, in accordance with an embodiment of the present invention. In the example shown in FIG. 2, for the sake of simplicity, the document collection comprises three categories denoted C1, C2 and C3. The three categories have some overlapping regions, demonstrating that some documents may belong to two or more categories simultaneously.

Different combinations of categories can be defined using Boolean expressions over the categories. For example, shaded area 36 in FIG. 2 is defined by the Boolean expression $C3 \cup (C1 \cap C2)$, wherein $\cup$ denotes the set union operator and $\cap$ denotes the set intersection operator. A Boolean expression defining a combination of categories is referred to as a "category restriction" (which may also include a single category). For example, assume that document collection 21 comprises a collection of text documents. Assume that category C1 comprises all Microsoft® Word files, category C2 comprises all documents larger that 1 MB, and category C3 comprises all files created before Jan. 1, 2000. The category restriction $C3 \cup (C1 \cap C2)$ comprises all Microsoft Word documents that are larger than 1 MB, and all documents in the collection that were created before Jan. 1, 2000.

As noted above, when searching within category restrictions, adjusting scores based on global statistics may cause improper ranking of the search results. The following example demonstrates this improper ranking effect. Consider a computer organization having a large collection of documents. The organization includes a small accounting division that owns a small subset of the documents in the collection. Typically, the vast majority of the organization's documents will contain the index term "computer." Only a small number of documents will contain the index term "costs." On the other hand, within the category of documents that belong to the accounting division, most documents will contain the index term "costs," and only a few will contain the index term "computer." In other words, the global and local document frequencies of the index terms "computer" and "costs" are totally different. The following table shows the term statistics of this example:

| Category | Number of documents | Documents containing "computer" | Documents containing "costs" |
|---|---|---|---|
| Entire collection | 100,000 | 90,000 | 1,000 |
| Accounting | 500 | 10 | 400 |

Now assume that a user from the accounting division issues a query for "computer costs" within the "accounting" category. If global statistics are used to rank the results, the term "costs" has a much lower document frequency than "computer," causing documents with many occurrences of "costs" to be ranked as top results. On the other hand, if local statistics are used, the term "computer," having far fewer occurrences than "costs," will now dominate the top results. Since "costs" is a very common index term within the accounting category, it should not be considered a good measure of relevance to this particular query. The above example shows that using global statistics in a category-based search may cause the most highly-relevant documents to be ranked too low. When the TRE uses "result pruning" (discarding of low-ranking documents from the list of search results) these low-ranked documents may not be retrieved at all.

Estimation of Local Statistics Using Histograms

The method described below provides a solution to the improper ranking by estimating the local document frequency (DF) within a given category restriction, using equi-width histograms. The method still maintains only a single index and a single set of global term statistics.

Histograms are a commonly-used technique for approximating large data distributions and joint distributions by grouping data items into buckets. Histograms offer a way to approximate large distributions, while requiring only modest memory space and computational complexity. For example, Piatetsky-Shapiro and Connell describe one application of histograms in "Accurate Estimation of the Number of Tuples Satisfying a Condition," Proceedings of the 1984 International Conference on Management of Data (ACM SIGMOD), Boston, Mass., pages 256-276. Another application of histograms is described by Chen et al., in "Selectivity Estimation for Boolean Queries," Proceedings of the 2000 ACM Symposium on Principles of Database Systems, Dallas, Tex., pages 216-225. Both papers are incorporated herein by reference.

For implementing the disclosed method, carried out by search processor 24, each document in collection 21 is assigned an identification number denoted DOC_ID. The document collection is partitioned into n equal-size, disjoint subsets called buckets. The buckets are denoted $b_i$, $i=1, \ldots, n$. Typical values for n are in the range of 10-100, although other values are also feasible in some applications.

A predetermined mapping function assigns each document to a particular bucket. (In other words, the mapping function maps DOC_IDs to bucket numbers.) In some embodiments, the mapping function comprises a "K-means" clustering algorithm. This algorithm divides a set of objects into K distinct subsets according to their similarity. A detailed description of the K-means algorithm is given by Agarwal et al., in "Exact and Approximation Algorithms for Clustering," Proceedings of the Ninth Annual ACM-SIAM Symposium on Discrete Algorithms, San Francisco, Calif., Jan. 25-27, 1998, pages 658-667, which is incorporated herein by reference. Alternatively, any other suitable mapping function that provides an approximately even distribution of DOC_IDs to bucket numbers can be used. (Generally speaking, however, random mapping of DOC_IDs to bucket numbers is not desirable, since it is likely to yield flat histograms.)

Search processor 24 represents the statistical distributions of the different index terms and categories using equi-width histograms. For each index term T, search processor 24 maintains an equi-width histogram comprising n bins, corresponding to the n buckets. Each bin denoted $h_i$ of the histogram gives the relative number of documents in bucket $b_i$ ($i=1, \ldots, n$) that contain the term T. The search processor maintains a similar histogram for each defined category. The histogram of a category $C_k$ comprises n bins $h_i$ that give the relative number of documents in bucket $b_i$ ($i=1, \ldots, n$) that belong to category $C_k$.

In one embodiment, the term histograms and category histograms are updated incrementally when documents are added to or deleted from the document collection. When a new document is added to the collection, the search processor maps it to one of the buckets, denoted $b_k$, using the mapping function. The processor then increments the kth bin of the term histograms of all index terms that appear in the newly-added document. The processor similarly increments the kth bin of the category histograms of all categories associated with the newly-added document. When a document, originally mapped to the kth bucket, is deleted from the collection, the processor performs a similar updating process. The processor decrements the kth bins of all relevant term and category histograms.

Figure 3A:
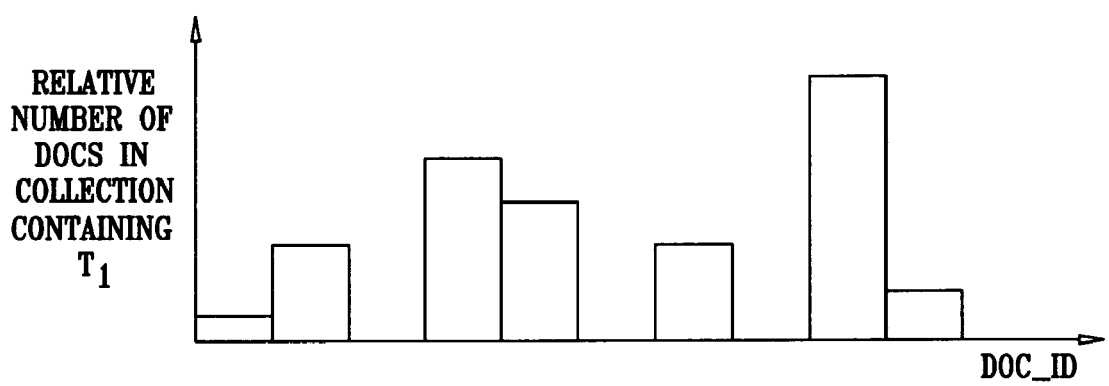
FIGS. 3A-3C are diagrams that schematically illustrate equi-width histograms, in accordance with an embodiment of the present invention.
Figure 3B:
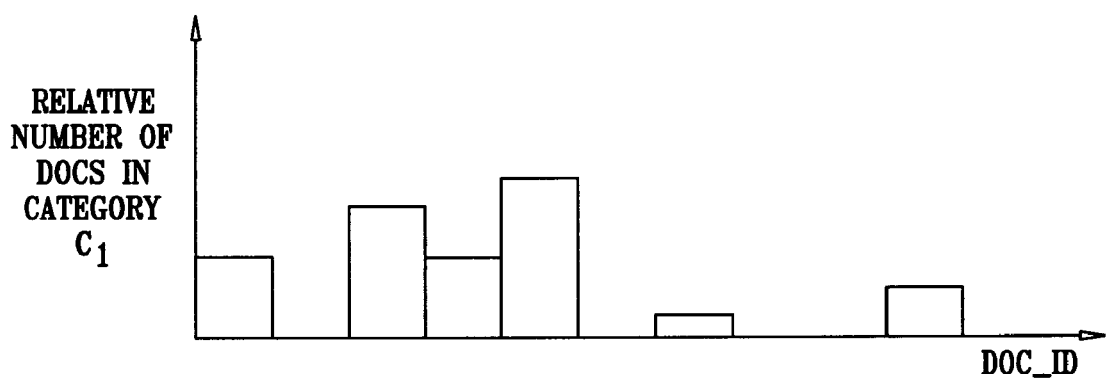
Figure 3C:
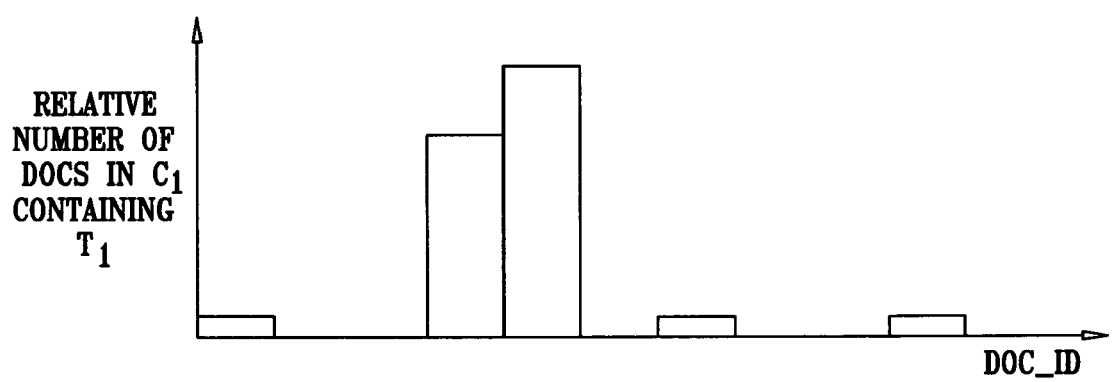

FIGS. 3A-3C are diagrams that schematically illustrate equi-width histograms, in accordance with an embodiment of the present invention. In this example, the document collection is partitioned into 10 buckets (n=10). FIG. 3A shows a term histogram 40 that corresponds to an index term denoted T1. Term histogram 40 can be viewed as an estimate of the global statistics of term T1, partitioned into buckets. In other words, the value of the ith bin of histogram 40 is an estimate of the probability that a document that belongs to bucket $b_i$ will contain term T1.

FIG. 3B shows a category histogram 42 that corresponds to a category denoted C1. As defined above, the ith bin of category histogram 42 gives the relative number of documents in bucket $b_i$ that belong to category C1. In other words, the value of the ith bin of histogram 42 is an estimate of the probability that a document that belongs to bucket $b_i$ will belong to category C1.

Since the same mapping function is used for constructing all the histograms in system 20, respective bins in histograms 40 and 42 pertain to the same subset of documents. An estimate of the local statistics of term T1 within category C1 is produced by multiplying respective bins of histograms 40 and 42.

FIG. 3C shows a localized term histogram 44, produced by multiplying the respective bins of histograms 40 and 42. Localized term histogram 44 can be viewed as an estimate of the local statistics of term T1 within category C1, partitioned into buckets. In other words, the value of the ith bin of histogram 44 is an estimate of the probability that a document in bucket $b_i$ that belongs to category C1 will contain term T1.

The estimated local document frequency DF of term T1 within category C1 is calculated by summing the n bins of localized term histogram 44. The resulting DF value can be subsequently used by the TRE in estimating local statistics, as will be explained below.

In some embodiments, the DF estimation method described by FIGS. 3A-3C above is generalized to estimate DF within a category restriction that comprises a combination of several categories. As described above, a category restriction is represented by a Boolean expression over one or more categories. In order to estimate local statistics within a category restriction, the processor uses the histograms of the individual categories in the Boolean expression to produce a category histogram that represents the category restriction.

For example, consider two categories C1 and C2 that are represented by two histograms denoted $H1=\{x1, \ldots, xn\}$ and $H2=\{y1, \ldots, yn\}$, respectively. The category restriction $C1 \cap C2$ is then represented by the histogram $H_{C1 \cap C2} = H1 \cdot H2 = \{x1 \cdot y1, x2 \cdot y2, \ldots, xn \cdot yn\}$, wherein $xi$ and $yi$ are the bins of histograms H1 and H2, respectively. The values of $xi$ and $yi$ are assumed to represent probabilities, and therefore $0 \leq xi, yi \leq 1$. Consider also a category restriction defined as $\overline{C1}$, denoting the complement of category C1 (i.e., all documents that do not belong to category C1). The histogram of $\overline{C1}$ is given by $\overline{H1} = \{1\text{-}x1, 1\text{-}x2, \ldots, 1\text{-}xn\}$. Since any Boolean function can be expressed in terms of intersection and complement operations, it is straightforward to produce a histogram that represents any category restriction using the histograms that represent the individual categories.

Although the embodiments described herein make use of equi-width histograms, the methods of the present invention may also be adapted for use with histograms of other types, in which the bins are not necessarily of equal widths.

The category restriction histogram is used by the search processor to estimate the local term statistics within the category restriction using the following method.

Document Searching Method

Figure 4:
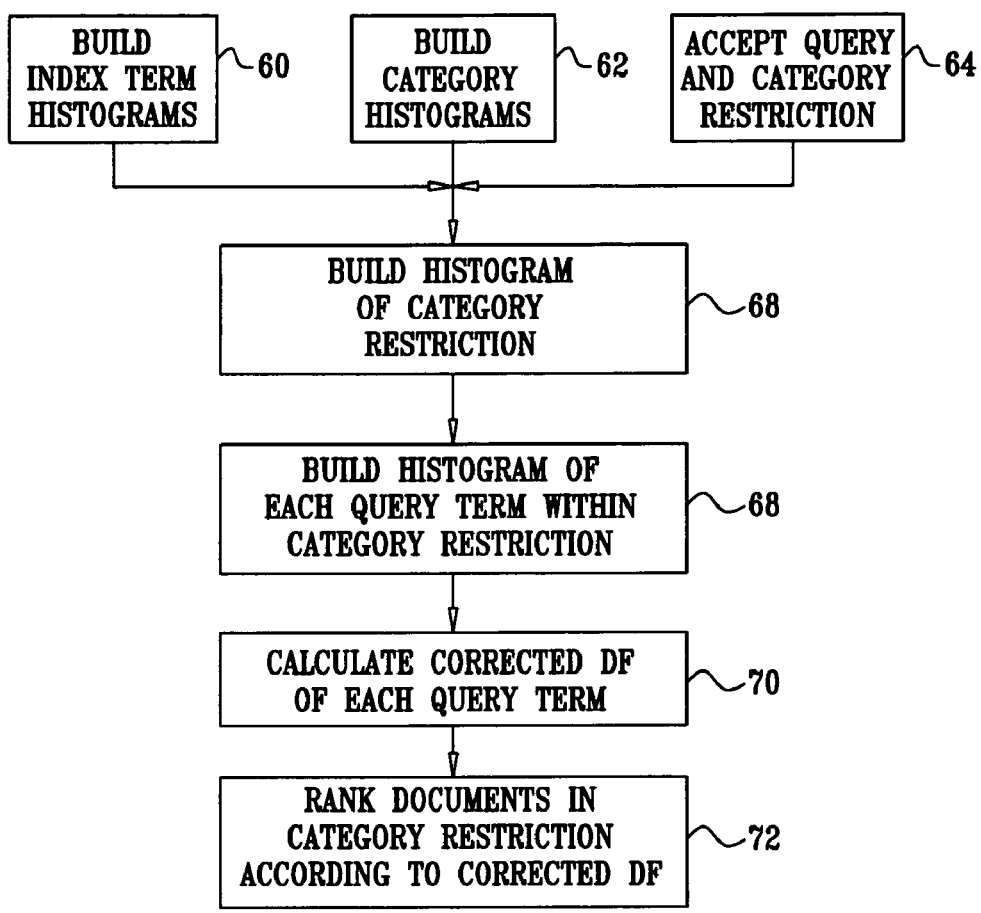
FIG. 4 is a flow chart that schematically illustrates a method for document searching, in accordance with an embodiment of the present invention.

FIG. 4 is a flow chart that schematically illustrates a method for category-based searching within category restrictions, in accordance with an embodiment of the present invention.

The method begins with search processor 24 constructing a set of term histograms, at a term histogram construction step 60. Each term histogram has the form of histogram 40 of FIG. 3A above. The processor may store the set of term histograms as part of the index of document collection 21, or in a separate data structure. In one embodiment, the processor constructs a term histogram for every index term in the index. In an alternative embodiment, the processor constructs and stores histograms only for commonly-used index terms. Histograms for rarely-used index terms are constructed only when the processor accepts a query that comprises such terms. The classification of index terms as commonly-used or rarely-used may follow any suitable criteria.

The processor also constructs and stores a set of category histograms, at a category histogram construction step 62. Each category histogram has the form of histogram 42 of FIG. 3B above. In one embodiment, the processor constructs a histogram for every defined category. In an alternative embodiment, the processor constructs and stores histograms only for commonly-used categories. Histograms for rarely-used categories are constructed only when the processor accepts a query that comprises such categories. Again, the classification of categories as commonly-used or rarely-used may follow any suitable criteria. (See also a discussion of "dynamic category restrictions" below.) The order of execution of steps 60 and 62 may be reversed if desired.

The search processor accepts a user query, at a query acceptance step 64. The user query comprises one or more index terms that describe the documents to be searched. The query also typically comprises a category restriction definition that describes a category or combination of categories over which the search should be performed. In one embodiment, the category restriction is represented by a Boolean expression over one or more categories.

Having accepted the query, the processor constructs a category restriction histogram that represents the category restriction, at a restriction histogram construction step 66. If the category restriction describes a single category to which the search should be restricted, the category restriction histogram has the same form as the category histogram of the category in question. Otherwise, the category restriction histogram may be constructed from the individual category histograms of the categories to which the category restriction refers. If the category restriction comprises rarely-used categories, for which pre-constructed category histograms may not exist, the processor constructs the necessary category histograms. (See also a discussion of "dynamic category restrictions" below.) Having retrieved or constructed the necessary category histograms, the processor uses these histograms to produce a category restriction histogram that represents the category restriction supplied in the user query. Calculation of the category restriction histogram is typically implemented using histogram intersection and complement operations, as described in the discussion of FIGS. 3A-3C above.

After calculating the category restriction histogram, the processor now constructs localized term histograms, at a localized construction step 68. The processor calculates, for each index term in the user query, a localized term histogram that represents the local term statistics (i.e., a modified term distribution) of this index term within the category restriction. As explained above, each localized term histogram is produced by multiplying the respective bins of the term histogram and the category restriction histogram. The output of step 68 is a set of histograms that estimate the local statistics of each index term in the query within the category restriction.

The processor calculates the estimated local DF for each index term in the user query, at a DF estimation step 70. As explained above, the estimated local DF of each index term within the category restriction is produced by summing the bins of the corresponding localized term histogram. The output of step 70 is a set of estimated local DF values, one DF value for each index term in the query. The estimated local DF values approximate the document frequency of the respective index term within the specified category restriction.

Finally, the processor ranks the documents that belong to the category restriction, at a ranking step 72. The processor uses the set of estimated local DF values, representing the term occurrences within the category restriction, to rank the documents. In one embodiment, the processor applies a scoring model based on the TF-IDF formula for ranking the documents. Alternatively, any other suitable scoring model may be used. Typically, the method returns a response comprising a ranked list of documents. Since the ranking is based on the localized term statistics of the specified category restriction, and not on global term statistics of the entire document collection, the ranking of the search results is typically much closer to the ranking that would have been returned by a local search over the sub-collection identified by the category restriction.

Processing Dynamic Category Restrictions

In some embodiments, the category restriction in the user query comprises categories that cannot be (or are chosen not to be) defined in advance. For example, consider a catalog, in which every item is associated with a price. The user query restricts the search only to items whose price is within a given range. Another example is a query that restricts the search to documents created within a given time interval. (In this case document creation dates are treated as index terms.) Such category restrictions are referred to as "dynamic category restrictions."

The search method described in FIG. 4 above can be generalized to the case of dynamic category restrictions. When the search processor executes restriction histogram construction step 66, it calculates a category histogram representing the dynamic category restriction. In one embodiment, the processor queries the TRE in order to identify the set of documents that satisfy the dynamic restriction (for example, identifying the set of documents that were created within a specified time interval). Typically, the processor queries the TRE using Boolean queries. Boolean queries are usually more efficient to execute in comparison to free text queries. Subsequently, the processor calculates the category histogram that represents this document set, following the same method used for ordinary categories. From this stage, the method continues to follow the flow of FIG. 4, as described above.

Searching Over Multiple Document Collections

In some practical cases, the document collection is subdivided into several (not necessarily disjoint) sub-collections. This configuration is sometimes preferred for scalability or performance reasons. Each sub-collection comprises its own index. A search can be restricted to a combination of sub-collections. The methods described above can also be used to perform proper ranking when searching over a restricted set of sub-collections. It is assumed that the entire document collection uses a single set of DOC_IDs and a single mapping function that assigns documents to buckets.

In some embodiments, the user query specifies a search over a combination of sub-collections. In these embodiments, the processor estimates the local term statistics using a respective combination of term histograms from the different sub-indices. For example, when searching over the union of two sub-collections, the processor produces a localized term histogram for each index term in the query. This localized term histogram is produced by calculating the union of the two term histograms from the two sub-collections.

The processor then performs two separate searches in the two sub-indices using the respective localized term histograms. The processor merges the two sets of results, to produce a single set of documents with proper ranking. This ranking approximates the ranking which would have been returned by a "naive" search over an index corresponding to the union of the two sub-collections.

Simulation Results

The inventors have simulated the search method described in FIG. 4 above, in order to demonstrate and quantify the effectiveness of the disclosed method.

The simulation program chose at random a group of 100 index terms from the TREC collection (a collection comprising 500,000 text documents, as described in "Overview of the Seventh Text Retrieval Conference (TREC-7)," Proceedings of the Seventh Text Retrieval Conference (TREC-7), National Institute of Standards and Technology, 1999. Each simulation run picked two index terms from the group of 100 terms, and applied the method of FIG. 4 to estimate the number of documents that contain both index terms. (This test was chosen because measuring the size of the intersection between two sets is a highly-sensitive test. Since the intersection is typically much smaller than the sets themselves, the relative error is much larger.)

The simulation estimated the DF values of these index terms, according to the method of FIG. 4. The estimated DF values were then compared with the actual DF values, for all possible combinations of term pairs (4950 pairs in total).

Figure 5:
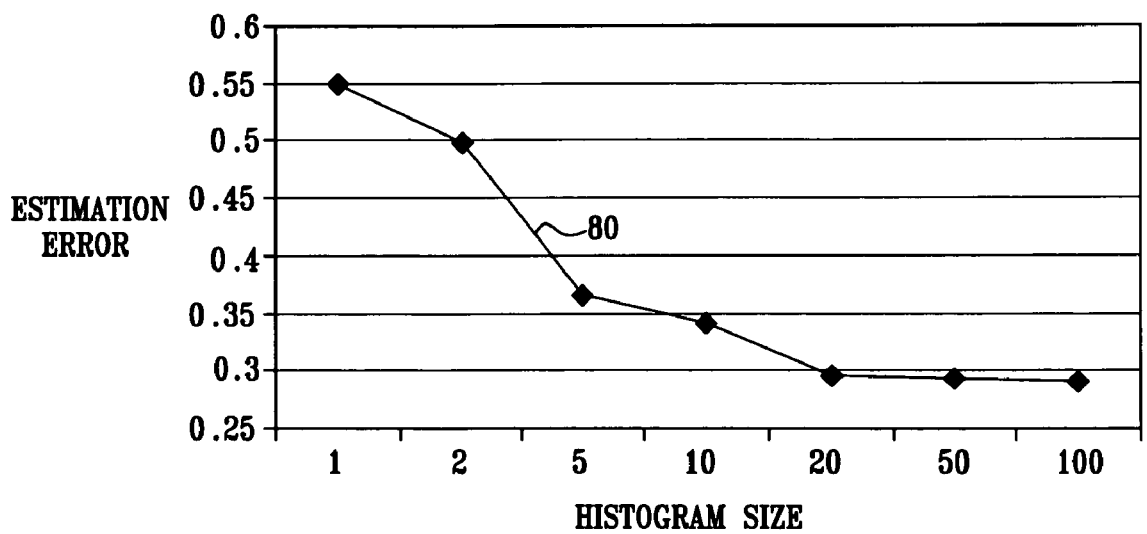
FIG. 5 is a plot that schematically illustrates document frequency estimation errors, in accordance with an embodiment of the present invention.

FIG. 5 is a plot that schematically illustrates document frequency estimation errors, in accordance with an embodiment of the present invention. A curve 80 shows the relative document frequency estimation error, as a function of the histogram size (i.e., the number of buckets). The error function used in the calculation is the "average absolute relative error" function described in the paper by Chen et al. cited above. As can be seen in the figure, the estimation error decreases with increasing histogram size. For histograms of 20 buckets and above, the error grows asymptotically small, indicating that the estimated DF values provide a good approximation of the actual values.

While the methods described hereinabove mainly addressed category-based retrieving of documents in a document collection, these methods can also be used for other applications that use statistical ranking of data items that are associated with categories.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for searching a document collection that includes a plurality of documents that are respectively associated with one or more categories and contain terms, the method comprising:

providing an index of the terms indicating the documents in which the terms appear;

estimating a first statistical distribution of each of at least some of the terms in the index over the documents in the collection;

estimating a second statistical distribution of each of at least some of the categories over the documents in the collection;

accepting a query comprising one or more of the terms and a specified category restriction referring to at least one of the categories;

computing a local term distribution, which is indicative of occurrence frequencies of at least one of the terms in the query within the specified category restriction, using the first and second estimated statistical distributions;

determining a category-specific score for the at least one of the terms responsively to the local term distribution within the specified category restriction; and applying the query to the index using the category-specific score so as to return a response, wherein estimating the first statistical distribution comprises constructing term histograms of the at least some of the terms in the index, wherein estimating the second statistical distribution comprises constructing category histograms of the at least some of the categories, and wherein constructing the term and category histograms comprises mapping the documents in the collection to bins of the histograms, and wherein computing the local term distribution comprises determining a category restriction histogram based on the category histogram of the at least one of the categories responsively to the category restriction, and multiplying the category restriction histogram by the term histogram of the at least one of the terms in the query so as to produce a localized term histogram.

2. The method according to claim 1, wherein constructing the term and category histograms comprises, when a document is added to or deleted from the collection, incrementally updating the term and category histograms responsively to the added or deleted document.

3. The method according to claim 1, wherein when the category restriction refers to two or more of the categories linked by a Boolean expression, determining the category restriction histogram comprises combining the category histograms of the two or more of the categories based on the Boolean expression.

4. The method according to claim 1, wherein determining the category-specific score comprises determining a local document frequency (DF) based on the local term distribution, and wherein applying the query to the index comprises processing the query using the local DF.

5. The method according to claim 1, wherein the response comprises a list of the documents, and wherein applying the query comprises ordering the list responsively to the category-specific score.

6. The method according to claim 1, wherein estimating the second statistical distribution comprises querying a text retrieval engine (TRE) responsively to the category restriction, so as to obtain a list of documents in the collection that are associated with the category restriction.

7. The method according to claim 1, wherein the categories comprise sub-collections of the document collection, wherein the category restriction refers to at least one of the sub-collections, and wherein computing the local term distribution comprises producing the local term distribution so as to describe the first statistical distribution within the sub-collections referred to by the category restriction.

* * * * *